United States Patent [19]

Robinson et al.

[11] 4,156,932
[45] May 29, 1979

[54] PROGRAMMABLE COMMUNICATIONS CONTROLLER

[75] Inventors: Steve Robinson; James A. Kennedy, both of Phoenix, Ariz.

[73] Assignee: Honeywell Information Systems Inc., Phoenix, Ariz.

[21] Appl. No.: 812,963

[22] Filed: Jul. 5, 1977

[51] Int. Cl.$^2$ .............................................. G06F 3/04
[52] U.S. Cl. ................................................ 364/200
[58] Field of Search ... 364/200 MS File, 900 MS File

[56] References Cited

U.S. PATENT DOCUMENTS

| | | | |
|---|---|---|---|
| 3,566,358 | 2/1971 | Hasbrouck | 364/200 |
| 3,699,532 | 10/1972 | Schaffer et al. | 364/200 |
| 4,028,668 | 6/1977 | Riikonen | 364/200 |

Primary Examiner—Gareth D. Shaw
Assistant Examiner—Thomas M. Heckler
Attorney, Agent, or Firm—Edward W. Hughes; W. W. Holloway, Jr.; R. T. Reiling

[57] ABSTRACT

A programmable communications controller having a microcomputer system for buffering and controlling data communications between a communication processor and a plurality of input/output (I/O) ports of the microcomputer system to which ports/terminals can be connected directly, or indirectly, by digital data communication lines. The random access memory of the microcomputer system is divided into blocks of addresses of locations in which digital data can be stored. One of these blocks is designated as a service block. The service block in turn is divided into sectors, one for each I/O port to which is connected a communication line, for example. Each sector in the service block is adapted to have written into it and read from it data unique to the servicing of a given communication I/O port and the communication line or data terminals connected to that port. The microcomputer system of the controller is provided with an automatic addresser which is under the control of the microcomputer system. The automatic addresser steers memory commands addressed to the service block to the sector of the service block assigned to the communication I/O port being serviced by the microcomputer system at that time by substituting the address of the communication I/O port being serviced for the address applied to the sector address lines of the address bus by the microcomputer system. The automatic addresser also steers, in a similar manner, I/O commands from the microcomputer system to the communication I/O port being serviced by the microcomputer system at that time by substituting the address of the port being serviced for the address of whatever I/O port is applied to the address lines of the microcomputer system.

4 Claims, 4 Drawing Figures

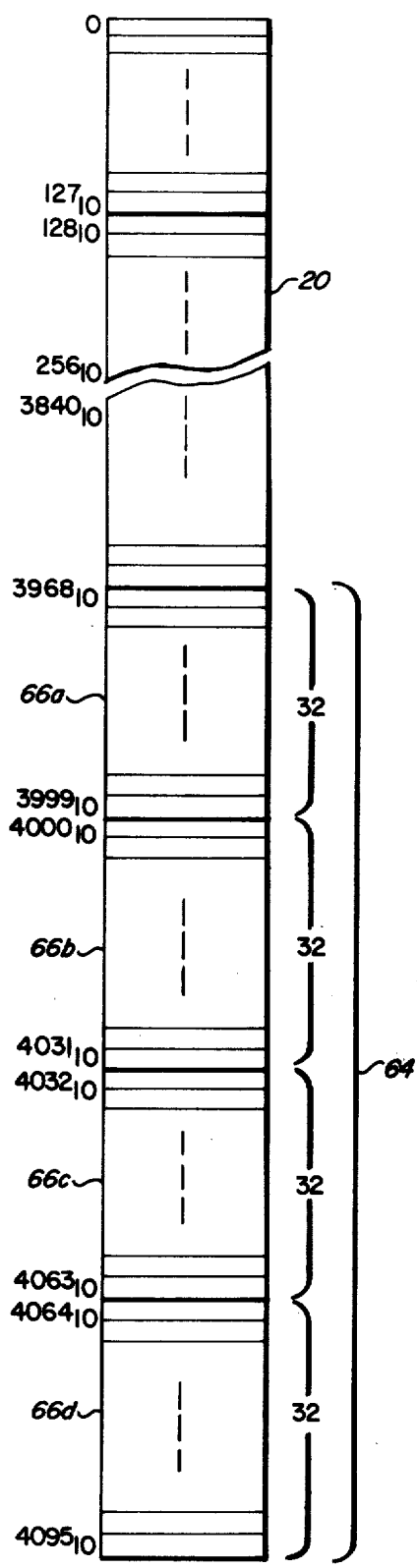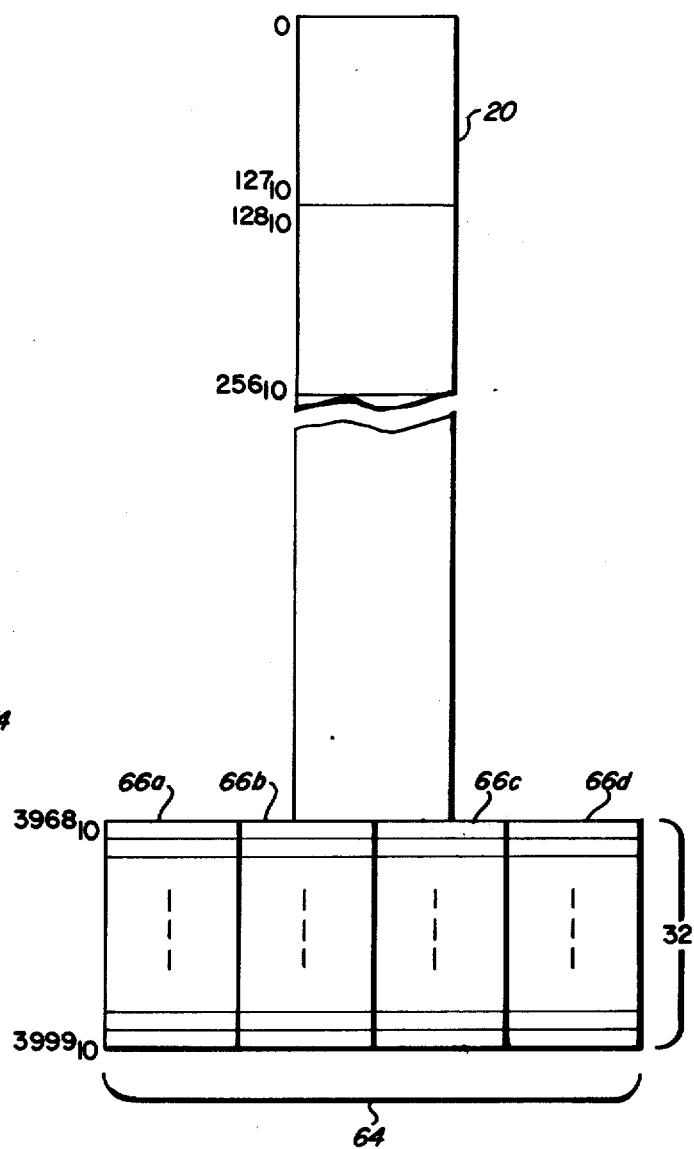

PROGRAMMABLE COMMUNICATIONS CONTROLLER

BACKGROUND OF THE INVENTION

1. Field of the Invention:

This invention is in the field of digital data communications, and more particularly, in the field of programmable communications controllers which buffer and control the transmission of data between a communication processor of a general purpose digital computer and a number of communication I/O ports of the controller to which ports terminal devices can be connected directly, or indirectly, by digital data communication lines.

2. Description of the Prior Art:

Microcomputer systems such as those developed by the Intel Corporation, the Intel 8080, which is described in detail in the Intel 8080 Microcomputer Systems User's Manual dated September 1975, have the capability of being programmed to control and buffer communications between a number of communication lines and a communication processor such as the Datanet 355 which is manufactured by Honeywell Information Systems Inc., the assignee of this invention.

Programmable communication controllers have many advantages derived from the fact that their microcomputer systems can be programmed. The chief advantage is that it is easier and less costly to change or modify a program than to change or modify hardware to permit, for example, terminals having different characteristics to be connected to such controllers or to add to or modify their operation. However, programmable communications controllers also have certain disadvantages, or limitations, when more than one communication line is serviced by such a controller which is normally the case. One such disadvantage is the requirement of testing before issuing memory or I/O commands to determine which I/O port, or communication line, is being serviced at that time. Such tests effectively slow down the microcomputer system and the communications controller, and thus limit the number of communication I/O ports, or communication lines, that can be serviced by a programmable communications controller all other parameters remaining the same.

Writing a separate program for each communication line to be serviced eliminates the need for testing to determine the communication line being serviced, but such a solution substantially increases the size of the addressable memory of the microcomputer system and, thus, the cost of the communications controller. This solution also increases the difficulty and cost of developing, testing and maintaining the necessary number of programs needed by the microcomputer system of a communications controller.

SUMMARY OF THE INVENTION

The present invention provides a programmable communications controller for controlling and buffering the communication of digital data between a communication processor and a plurality of communication I/O ports of a conventional microcomputer system to which ports communication lines may be connected. The microcomputer system of the controller is provided with an automatic addresser which is under the control of the microcomputer system. When a memory command is issued addressed to the service block of the random access memory of the microcomputer system, the automatic addresser substitutes the address of the I/O port being serviced by the controller at that moment for the sector address applied to the address bus of the microcomputer system by the microcomputer system's central processor module (CPM) to steer memory commands to a given location of a designated sector of the service block of memory. Data unique to the communication I/O port being serviced at that time is written into or read from this sector. The automatic addresser will also substitute the address of the I/O port being serviced at any given instant in time for whatever I/O port address is applied to the address bus by the CPM when an I/O command is issued by the CPM to steer the I/O command to the port of the controller being serviced. The automatic addresser, thus, makes it possible for a microcomputer system to be programmed as if it were servicing only one communication I/O port, or one communication line rather than a number of such lines each of which lines may have different types of terminals connected to them. The automatic addresser eliminates the need for testing to determine which communication line is being serviced by the microcomputer system at any given time and reduces the amount of memory required to properly service a given number of communication lines.

It is, therefore, an object of this invention to provide a microcomputer system with an automatic addresser.

It is another object of this invention to provide an automatic addresser for a programmable communications controller which addresser steers selected memory commands to a predetermined sector of a service block of memory and I/O commands to a predetermined communication I/O port irrespective of the sector address and the I/O port address applied to the address bus of the microcomputer system.

It is still another object of this invention to provide a programmable communications controller for a plurality of communication lines which can be substantially programmed as if it were servicing only a single communication line.

It is yet another object of this invention to provide a programmable communications controller for a plurality of communication lines utilizing a microcomputer system in which there is no need for the program controlling the microcomputer system to test to determine which of a plurality of communication line is being serviced at any given time.

It is a further object of this invention to provide a programmable communications controller for a plurality of digital data communication lines which is relatively more easily programmed and the programs for which are more readily maintained.

BRIEF DESCRIPTION OF THE DRAWINGS

Other objects, features and advantages of the invention will be readily apparent from the following description of a preferred embodiment thereof, taken in conjunction with the accompanying drawings, although variations and modifications may be affected without departing from the spirit and scope of the novel concepts of the disclosure, and in which:

FIG. 2 is a memory map of the microcomputer system of FIGS. 1A and 1B when the automatic addresser is not enabled; and FIG. 3 is a memory map of the microcomputer system of FIGS. 1A and 1B when the automatic addresser is enabled.

DESCRIPTION OF THE PREFERRED EMBODIMENT

Figure 1A:
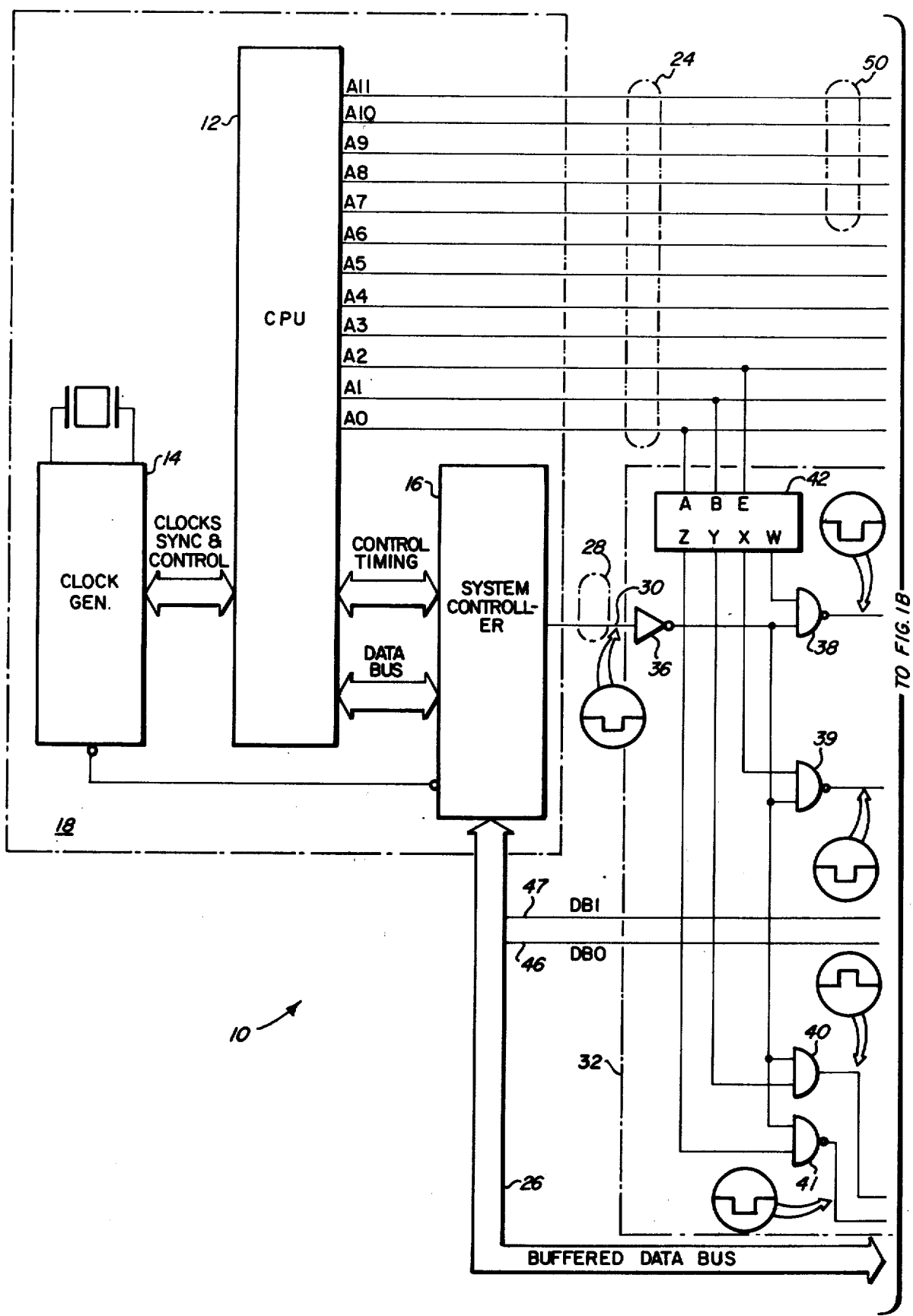
FIGS. 1A and 1B together constitute a block diagram of the programmable communications controller.

In FIG. 1 programmable communications controller 10 has a central processor unit (CPU) 12, a clock generator 14, and a system controller 16. CPU 12, clock 14 and system controller 16 form the central processing module (CPM) 18 of a conventional microcomputer system. The microcomputer system also has random access memory 20 and a plurality of I/O ports, some of which are communication I/O ports 22a, 22b, 22c and 22d each of which, in the preferred embodiment, is a conventional communication line controller. The microcomputer system of controller 10 theoretically can have 256 I/O ports, some of which would be used to communicate with a communication processor for example. Address bus 24, in a preferred embodiment, has 12 address lines $A_0$–$A_{11}$, and interconnects CPU 12 and memory 20 so that CPU 12 can apply address signals to memory 20. Eight of the lower order address lines $A_0$–$A_7$ are also used to address I/O ports of the microcomputer system. Data bus 26 interconnects system controller 16, memory 20, and the communication I/O ports, or communication line controllers 22a, 22b, 22c and 22d. In the preferred embodiment, data bus 26 has eight data lines, which are not illustrated, so that eight bits of data, or a byte, can be transferred in parallel between CPM 18 and memory 20 or between a communication line controller 22a, 22b, 22c or 22d and CPM 18. Activities of subsystems of the microcomputer system are controlled by control signals applied to control lines of control bus 28, only one line of which is illustrated. Communication of data between controller 10 and a communication processor, or a general purpose digital data processor, uses data bus 26, address bus 24, control bus 28 and one or more I/O ports. Since such processors and the manner in which they communicate with a communications controller are conventional and form no part of this invention, details of how controller 10 communicates with a communication processor, for example, are not illustrated or described.

Figure 1B:
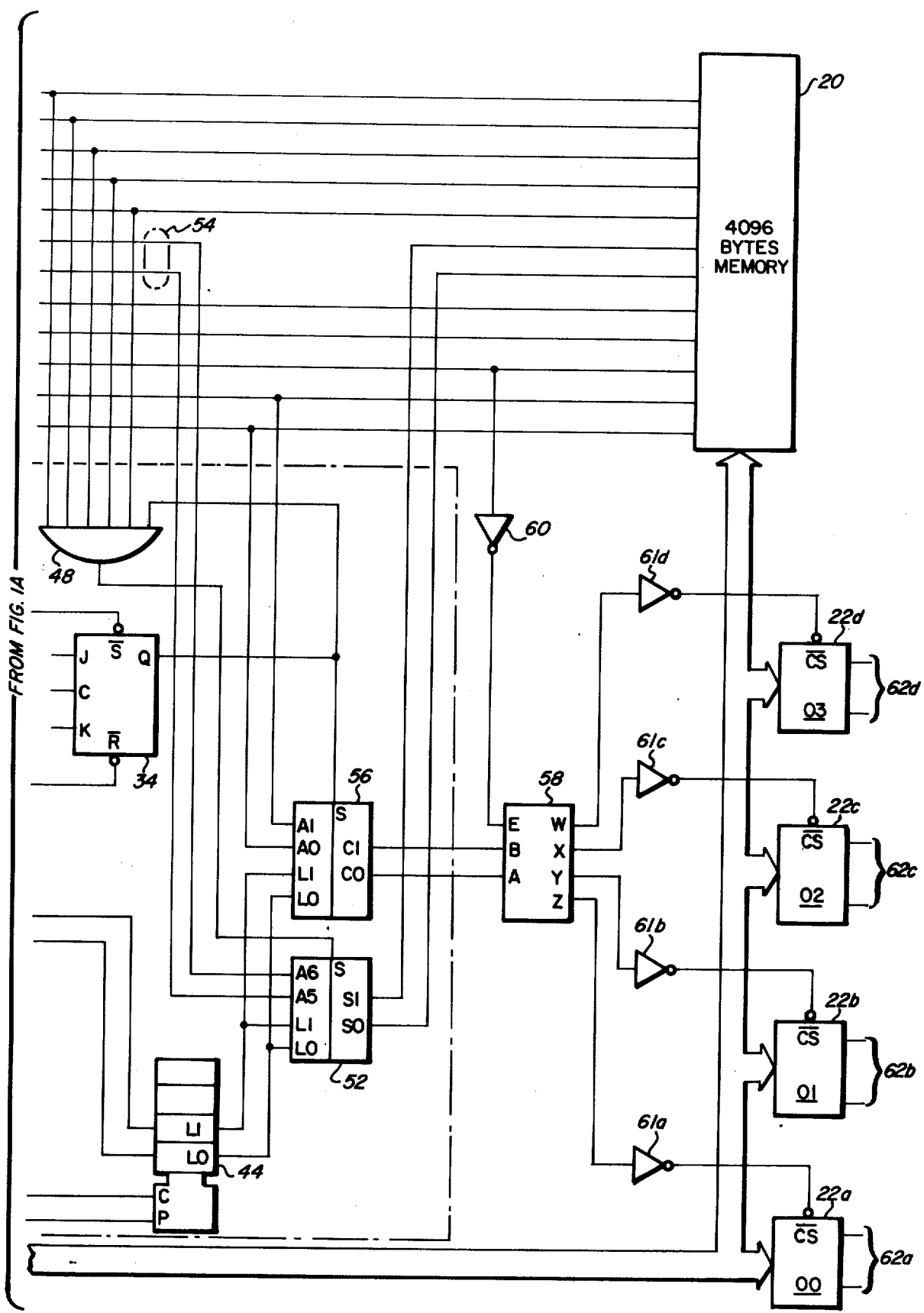

In FIGS. 1A and 1B, automatic addresser control line 30 of bus 28 and low order I/O port address lines $A_0$–$A_2$ are used to control automatic addresser 32. Automatic addresser 32 includes enable flip-flop 34 which, if set, enables automatic addresser 32 to function, or operate, as will be described below. If flip-flop 34 is reset, automatic addresser 32 is disabled, and the microcomputer system of controller 10, which is comprised of CPM 18, random access memory 20, communication line controllers 22a, 22b, 22c and 22d, address bus 24, data bus 26 and control bus 28 will function, or operate, as if automatic addresser 32 were not present. The negative going addresser enable signal, or pulse, applied to line 30 is inverted by inverter 36, and the inverted signal is applied to one input terminal of each of gates 38, 39, 40 and 41 each of which has two input terminals. The input terminals of control decoder 42 are connected to the low order address lines $A_0$, $A_1$, $A_2$ of address bus 24. Depending on the binary values of the signals supplied to address lines $A_0$ and $A_1$ and if $A_2$ which is connected to the enable terminal of control decoder 42 has a binary value of 1, or is high, one of the four output terminals W, X, Y or Z of decoder 42 will be high, or positive. The other terminal of NAND gate 38 is connected to the W terminal of decoder 42, the other terminal of NAND gate 39 is connected to the X terminal, the other terminal of AND gate 40 to the Y terminal, and the second terminal of NAND 41 is connected to the Z terminal. Thus, one terminal of each of the gates 38, 39, 40 and 41 has applied to it the inverted addresser enable signal strobe and the other terminal of each of these gates is connected to a different one of the four output terminals of decoder 42. The following table shows the relationship, in a preferred embodiment, between the binary values of the signals applied or present on lines $A_0$, $A_1$ and $A_2$ and the output, or control, 30 signals on output terminals W, X, Y, Z of decoder 42.

| $A_0$ | $A_1$ | $A_2$ | W | X | Y | Z |
|---|---|---|---|---|---|---|
| 0 | 0 | 1 | 0 | 0 | 0 | 1 |
| 1 | 0 | 1 | 0 | 0 | 1 | 0 |
| 0 | 1 | 1 | 0 | 1 | 0 | 0 |
| 1 | 1 | 1 | 1 | 0 | 0 | 0 |
| X | X | 0 | 0 | 0 | 0 | 0 |

If CPM 18 produces an addresser enable strobe, and if at the same time address signals on address line $A_0$, $A_1$ and $A_2$ have binary values as described in the fourth line of the above table, W terminal of decoder 42 will be a logical 1 and NAND gate 38 will produce a negative pulse at its output terminal. The output signal of NAND gate 38 is applied to the $\overline{S}$ terminal of enable flip-flop 34. The negative going edge of this pulse, or signal, sets flip-flop 34 so that its output signal at its Q terminal is high or a binary one and it will remain high until reset, and automatic addresser 32 is enabled. NAND gate 39 has its output terminal connected to the $\overline{R}$, or reset, terminal of flip-flop 34. If an addresser enable is produced by CPM 18, and if the address signals applied to lines $A_0$, $A_1$ and $A_2$ at the same time are such as to cause terminal X of decoder 42 to be a logical one, a negative signal is applied by gate 39 to the $\overline{R}$ terminal of flip-flop 34 which resets it. When enable flip-flop 34 is reset, the output signal at its Q terminal is negative, or a logical 0, and it will remain so until it is set, and automatic addresser 32 is disabled.

If a positive pulse, or signal, is applied to the "C", or count, terminal of counter register 44, counter register 44 will increment by one whatever count is stored in it. This occurs if an addresser enable signal is produced by CPM 18, and if at the same time the "Y" terminal of the decoder 42 is a logical 1 as the result of the set of binary signals on address lines $A_0$–$A_2$. If NAND gate 41 applies a negative pulse to preset terminal P of register counter 44, counter 44 will preset to the value corresponding to the binary values of the signals present on data lines $DB_0$ and $DB_1$ of data bus 26 which are applied to the input terminals of counter 44 by conductors, or lines, 46, 47.

The output, or enable, signal at the Q terminal of flip-flop 34 is applied to the enable input terminal of AND gate 48. The input terminals of sector gate 48 are connected respectively to block address lines 50, address lines $A_7$ through $A_{11}$, of address bus 24. Thus, if flip-flop 34 is enabled and if the signals on block address lines 50 are logical ones, or high, the output, or sector enable, signal of gate 48 will also be a logical one or high. The sector enable signal of gate 48 is applied to one of two select sector switch 52. Sector address lines 54, address lines $A_5$ and $A_6$ of address bus 24, in the preferred embodiment, are connected to switch 52 as are the output signals of counter register 44. Thus, when gate 48 produces a positive, or sector enable, signal which can only occur if flip-flop 34 is enabled and if the address signals on block address lines 50 have a predetermined value, all "1's" in the preferred embodiment, sector switch 52 applies the signals stored in counter register 44 to its output terminals $S_0$, $S_1$ and these signals are applied to memory 20 in place of the sector address signals placed on sector address lines 54 by CPM 18. In the absence of such a sector enable signal from gate 48, the sector address signals applied to sector address lines $A_5$, $A_6$ by CPM 18 are applied by sector switch 52 to memory 20.

The output of enable flip-flop 34 is also applied to the select terminal of one of two select communication line switch 56. The output terminals of counter register 44 are also applied to communication line switch 56 as well as are the I/O port address signals placed on address lines $A_0$ and $A_1$ of address bus 24. The output signals of switch 56 are applied to I/O decoder 58. I/O decoder 58 is controlled, or enabled, by the signal on address line $A_2$ of address bus 24 which is inverted by inverter 60 and applied to the enable terminal of decoder 58. Thus, when flip-flop 34 is set, or enabled, switch 56 will apply the signals produced by counter register 44 to decoder 58 in place of the signals applied to address lines $A_0$, $A_1$ by CPM 18. If flip-flop 34 is not set, switch 56 applies the signals applied to address line $A_0$, $A_1$ to decoder 58. Depending on the binary values of the signals applied to decoder 58 and if decoder 58 is enabled by a logical 0 being placed on address line $A_2$, one of the four output terminals W, X, Y or Z of decoder 58 will be a logical one and the rest logical zeros. The outputs of decoder 58 are inverted by inverters 61a, 61b, 61c, 61d and are applied respectively to the chip select terminals CS of communication line controllers 22a, 22b, 22c, 22d to select which of the communication line controllers can communicate with CPM 18. Each communication line controller 22a, 22b, 22c, 22d has a conventional communication line 62a, 62b, 62c, 62d connected to it which can be either a simplex, a half duplex, or a full duplex line. As a result, digital data can be received by a communication line controller from one or more conventional terminal devices connected to its communication line, or a communication line controller can transmit data by such line to a terminal device or devices connected to that line.

FIG. 2 is a memory map of random access memory 20. In a preferred embodiment memory 20 has 4096 memory locations, or addresses. In each such location, or at each such address, memory 20 can store eight bits of data, or a byte. Memory 20 can be considered as being divided into 32 blocks of memory with each block containing, or having, 128 memory locations or addresses. Each block can in turn be divided into four sectors of 32 memory locations or addresses each of which has the capability of storing a byte or data. The higher order bits of a memory address are applied to memory 20 by block address lines 50, address lines $A_7$–$A_{11}$ of address bus 24, and determine which block of memory is being addressed. The values of the bits applied to the sector address lines 54, address lines $A_5$, $A_6$, of address bus 24 determine the sector of an addressed block being addressed. Lower order bits, $A_0$–$A_4$ determine the address of the memory location within the addressed sector.

It has been discovered that one block of memory 20, service block 64, can store all the data necessary to permit one program to service a number of communication line controllers 22. In service block 64 one sector 66a, 66b, 66c or 66d is assigned to store the data required to permit controller 10 to service one communication I/O port to which a communication line controller is connected for example. Automatic addresser 32, when enabled, can be controlled by the microcomputer system to provide the address of the communication I/O port being serviced at that time to steer memory and I/O commands to the proper memory locations or communication I/O port, communication line controller, or communication line whenever a memory command is issued to service block 64 of memory 20 or an I/O command is issued to one of the communication line controllers 22a, 22b, 22c or 22d. The microcomputer system of communication controller 10 can be, for all practical purposes, programmed independently of the number of communication lines or communication line controllers being serviced by controller 10. As a result, the program for the microcomputer system is essentially written as if controller 10 were only servicing a single communication line controller.

In FIG. 2 memory 20 is illustrated in a conventional way with service block 64 having 128 memory locations whose addresses in the preferred embodiment range from addresses $3968_{10}$ to $4095_{10}$. Service block 64 is divided into four sectors 66a, 66b, 66c, 66d of 32 memory locations each, one for each communication I/O port. In a preferred embodiment the type of information stored in a sector such as sector 66a needed to service communication I/O port 22a, for example, is the starting address of the next portion of the program to be executed to service that communication I/O port. This address is placed in memory locations $3968_{10}$–$3969_{10}$ of sector 66a. The longitudinal redundancy check residue is stored in location $3970_{10}$. Location $3971_{10}$ is used to store a status byte. This byte represents the current status of the process, such as data set ready, framing error, parity error, transmit enable, etc. The address of a data buffer pointer is stored at addresses $3972_{10}$–$3973_{10}$ and is the beginning address in memory of a data buffer where incoming or outgoing characters or bytes of data are to be stored or found. If the communication line being serviced is a duplex line, a second data buffer pointer is needed. The number of characters stored, or to be stored, in a buffer, the character count, is stored in locations $3974_{10}$, $3975_{10}$. If a duplex line is being serviced a second character count will be stored in sector 66a. The balance of the memory locations within a sector are used to store such information as is needed to service that communication I/O port such as the bit rate of the communication line, format of characters being communicated, and type of control signals used by terminals connected to a communication I/O port or communication line controller. Within each sector the binary address of the location in which equivalent data is to be stored such as the program counter, data buffer pointer, character count, etc. are the same. Obviously the size of a sector and the locations within a sector of the data needed to service a communication I/O port can vary.

If automatic addresser 32 is disabled and if the block address applied to the block address lines 50 of address bus 24 is that of service block 64, then the address signals applied to the sector address line 54 of address bus 24 by CPM 18 will be applied by sector switch 52 to memory 20 and the microcomputer system will function as if automatic addresser 32 were not present. When automatic addresser 32 is enabled, service block 64 is effectively restricted to one sector of 32 memory locations assigned to the communication I/O port, communication line controller, or communication line being serviced at that time as is illustrated in FIG. 3 so that the size of memory 20 appears for all practical purposes to be reduced to $4000_{10}$ address locations from $4096_{10}$.

The function of communications controller 10 is to control and buffer the transmission of data between conventional digital data terminals and a communication processor, for example. Controller 10 accepts data that is transmitted from a communications processor in parallel, normally eight bits, and transmits such data to a given terminal which can receive data serially. Controller 10 also accepts bit serial information from terminals and forwards the data received as bytes of data which are sent to the communication processor in parallel. Controller 10 also has the function of checking for errors, arranging to receive and transmit data having various kinds of formats and communication conventions, at bit rates needed to service different kinds of terminals which can be connected to its communication I/O ports.

At the time controller 10 is energized, its program will be loaded into memory 20 unless it is in a read only memory. The block of memory to be used as the service block of memory and its size is determined. In a preferred embodiment it is the upper block of 128 bytes, although any block could be used, the block is divided into sectors, one for each communication I/O port to which a communication line controller or terminal device or devices are connected. In a preferred embodiment the size of each sector is 32 bytes. A sector size is generally the smallest integral power of two needed to store data unique to each communication I/O port required by the program of the microprocessor system to service each such port. The address of each of these communication I/O ports is also designated as the address of a sector of the service block. The data required to service each such I/O port is then read into the sector of the service block whose sector address is that of the I/O port to be serviced by that sector.

When an I/O port to which a communication line controller such as controller 22a which has a binary address of 0 0, for example, is to be serviced the microprocessor system must set counter register 44 so that it is storing the address of the I/O port being serviced in this example, 0 0, and binary signals representing 0 0, are applied to data bus $DB_0$ and $DB_1$ and to register 44. This is accomplished by applying at the time the communication I/O port's address is applied to line $DB_0$ and $DB_1$ control signals of the proper binary values to address lines $A_0$, $A_1$, and $A_2$ and an $\overline{I/OW}$ strobe to line 30 to cause gate 41 to apply a negative pulse to terminal P of register 44. Enable flip-flop 34 is set by applying binary signals of the preferred values to address lines $A_0$, $A_1$ and $A_2$ at the same time that an $\overline{I/OW}$ strobe is applied to line 30. Thereafter, whenever a memory command is issued to memory 20 addressed to service block 64, automatic addresser 32 will apply the output signals $L_0 L_1$ of counter 44 to memory 20 in place of the sector address signals applied to sector address lines 54 by CPM 18.

When the microprocessor system is to communicate with the communication I/O port being serviced, automatic addresser 32 will apply the signals stored in register 44 to I/O decoder 58 to select the communication line controller 22 to communicate with the microcomputer system if flip-flop 34 is enabled and a logical "0" or a negative signal is applied to address line $A_2$.

When the servicing of one communication I/O port is finished, controller 10 is ready to service the next such port by causing counter register 44 to increase, or increment, its count by 1 so that the signals at its output terminal $L_0$, $L_1$ are the address of the next communication I/O port to be serviced. In order to increment the count of counter register 44 it is only necessary for CPM 18 to produce an $\overline{I/OW}$ strobe and the appropriate address signals on address lines $A_0$, $A_1$ and $A_2$ to cause terminal Y of decoder 42 to go high. When this happens gate 40 applies a positive count pulse to counter register 44, this pulse causes counter register 44 to increment its count by one. Enable flip-flop 34 need not be set unless in the meantime it has been reset.

From the foregoing it is believed readily apparent that this invention provides a hardware solution to the problems of a programmable communication controller so that one program can be used to service, or control, a number of communication line controllers to which communication line controllers terminals having different bit rates, character codes, control codes and procedures can be connected. The specific data needed by the program for each of such communication line controller is stored in a separate sector of a service block of memory, one sector for each communication line controller. The solution, the automatic addresser, steers memory commands addressed to the service block to the sector for the I/O port of the communication line controller being serviced at that time and I/O commands to the communication I/O port being serviced at that time.

In a preferred embodiment, the components of automatic addresser 32 are:

|  | Model No. |
| --- | --- |
| Gates 38, 39, 41 | Sn74H00 |
| Gate 40 | 74LS08 |
| Inverter 36, 60 | SN74H04 |
| 61a, 61b, 61c, 61d |  |
| Gate 48 | 74SL08 |
| Register Counter 44 | SN74193 |
| Flip-flop 34 | 74H106 |
| Switch 52, 56 | 74S158 |
| Decoder 42, 58 | SN74155 | which are standard commercial items manufactured by the Texas Instruments Corporation for example. The components of the microcomputer system are:

| CPU 12 | Intel 8080 |
| --- | --- |
| Clock 14 | Intel 8224 |
| System Controller 16 | Intel 8228 |
| Memory 20 | 32 Intel 8102A's |
| Communication Line Controllers 22 | Intel 8251 |

It should be evident that various modifications can be made to the described embodiment without departing from the scope of the present invention.

We claim as our invention:

1. In a programmable communications controller having a microcomputer system: said system including a central processing module; a random access memory, a plurality of communication I/O ports, each port having a chip select terminal; a data bus having a plurality of data lines interconnecting the random access memory, the communications I/O ports, and the central processing module; an address bus having a plurality of address lines interconnecting the module with the random access memory, said address bus having block, sector and I/O port address lines; an I/O port decoder having input terminals, output terminals and an enable terminal, said output terminals being connected respectively to the chip select terminals of the I/O ports; and a control bus having a plurality of control lines, one of said control lines being the addresser control line adapted to have an addresser enable control signal applied to it by the system; the improvement comprising;

control decoder means having input and output terminals and an enable terminal, said input terminals and enable terminal being connected to selected ones of the I/O port address lines of the address bus for producing a control decoder control signal at one output terminal when an enable signal is applied to the enable terminal, the output terminal at which the control signal is produced being determined by the signals on the I/O port address lines connected to the input terminals;

enable flip flop means having output terminals and two states, circuit means connecting the enable flip flop to output terminals of the control decoder means and to the addresser control line for placing the flip flop in its one state when one set of address signals is present on the I/O address lines and an enable control signal is present on the addresser control line, and in its second state when a second set of address signals is present on the I/O address lines connected to the control decoder and an enable control signal is present on the addresser control line;

sector gate means having input terminals and an output terminal and an enable terminal, said input terminals being connected to the sector address lines of the data bus, said enable terminal being connected to an output terminal of the enable flip flop, said sector gate means producing a sector enable signal at its output terminal when the address signals on the sector address lines have predetermined values and the enable flip flop is in said one state;

counter register means having input terminals and an output terminal, the input terminals being connected to selected ones of the data lines of the data bus for storing data signals on said selected data lines when a third set of address signals is applied to the input terminals of the control decoder means and an enable control signal is present on the addresser control line and for incrementing the count of the counter register means when a fourth set of address signals is applied to the input terminals of the control decoder and an enable control signal is present on the addresser control line;

sector switch means having input and output terminals and a select terminal, said input terminals being connected to the output terminals of the counter register and to the sector address lines of the address bus, said output terminals being connected to the random access memory, said select terminal being connected to the output terminal of the sector enable gate, said sector switch means applying the signals stored in the counter register to the memory when the sector enable gate produces a sector enable signal and applying the signals applied to the sector address lines by the module to the memory when the sector gate is not producing a sector enable signal; and communication line switch means having input terminals, output terminals, and a select terminal, the input terminals being connected to the output terminals of the counter register and to selected ones of the I/O port address lines of the address bus, said select terminal being connected to an output terminal of the enable flip flop, the output terminals of the communication line switch being connected to the input terminals of the I/O port decoder, said communication line switch applying the count stored in the counter register to the I/O port decoder when the enable flip flop is in its said one state and for applying the signals applied to the corresponding I/O port address lines to the I/O port decoder when the enable flip flop is in its second state, said enable terminal of the I/O port decoder being connected to one of the I/O port address lines of the address bus.

2. The communication controller of claim 1 in which the enable terminal of the control decoder and the I/O port decoder are connected to the same I/O port address line.

3. In a programmable communications controller having a central processor module; a random access memory; a plurality of communication I/O ports, each port having a chip select terminal; a data bus having a plurality of data lines interconnecting the random access memory, the communications I/O ports, and the central processor module; an address bus having a plurality of address lines interconnecting the module with the random access memory, said address bus having block, sector and I/O port address lines; an I/O port decoder having input terminals, output terminals and an enable terminal, said output terminals being connected respectively to the chip select terminals of the I/O ports; and a control bus having a plurality of control lines connected to the module, one of said control lines being an addresser control line adapted to have an addresser enable control signal applied to it by the module; the improvement comprising:

a control decoder having input and output terminals and an enable terminal, said input terminals and enable terminals being connected to selected ones of the I/O port address lines of the address bus;

an enable flip flop having output terminals and having two states, said flip flop being connected to two different output terminals of the control decoder and to the address control line so that the enable flip flop is placed in one of its states when one set of address signals is present on the selected ones of the I/O address lines and an enable control signal is present on the addresser control line, and so that said enable flip flop is placed in its second state when a second set of address signals is present on the I/O address lines connected to the control decoder and an enable control signal is present on the addresser control line;

a sector gate having input terminals, an output terminal and an enable terminal, said input terminals being connected to the sector address lines of the data bus, said enable terminal being connected to an output terminal of the enable flip flop, said sector gate producing a sector enable signal at its output terminal when the address signals on the sector address lines have predetermined values and the enable flip flop is in one of its two states;

a counter register having input terminals and output terminals, the input terminals being connected to selected ones of the data lines of the data bus, said counter register storing the data signals on said selected data lines when a third set of address signals is applied to the input terminals of the control decoder and an enable control signal is present on the addresser control line, said counter register incrementing the count stored by it when a fourth set of address signals is applied to the input terminals of the control decoder and an enable control signal is present on the addresser control line;

a sector switch having input and output terminals and a select terminal, said input terminals being connected to the output terminals of the counter register and to the sector address lines of the address bus, said output terminals being connected to the random access memory, said select terminal being connected to the output terminal of the sector enable gate, said sector switch applying the signals stored in the counter register to the memory when the sector enable gate produces a sector enable signal and applying the signals applied to the sector address lines by the module to the memory when the sector gate is not producing a sector enable signal; and a communication line switch having input terminals, output terminals and a select terminal, the input terminals being connected to the output terminals of the counter register and to selected ones of the I/O port address lines of the address bus, said select terminal being connected to an output terminal of the enable flip flop, the output terminals of the communication line switch being connected to the input terminals of the I/O port decoder, said communication lines switch applying the count stored in the counter register to the I/O port decoder when the enable flip flop is in its said one of two states and applying the signals applied to the corresponding I/O port address lines to the I/O port decoder when the enable flip flop is in its other state, said enable terminal of the I/O port decoder being connected to one of the I/O port address lines of the address bus other than said selected ones connected to the input terminal of the communication line switch.

4. A programmable communications controller comprising:

a microcomputer system having a CPU; a random access memory; a system controller; a plurality of communications I/O ports, each port having a chip select terminal; a data bus having a plurality of data lines interconnecting the random access memory, the communications I/O ports, and the system controller; an address bus having a plurality of address lines interconnecting the CPU with the random access memory, said address bus having block, sector and I/O port address lines; and a control bus having a plurality of control lines connected to the system controller, one of said control lines being an automatic addresser control line adapted to have an addresser enable signal applied to it by the system controller;

a control decoder having input and output terminals and an enable terminal, said input terminals and enable terminal being connected to selected ones of the I/O port address lines of the address bus;

an enable flip flop having an output terminal and having a set and reset state, said flip flop being connected to two different output terminals of the control decoder and to the addresser control line so that it is set when a unique set of address signals is present on the I/O port address lines and an addresser enable signal is present on the automatic addresser control line, and so that said enable flip flop is reset when another unique set of address signals is present on the I/O port address lines connected to the control decoder and an addresser enable signal is present on the automatic addresser control line;

a sector gate having input terminals, an enable terminal and an output terminal, said input terminals being connected to the sector address lines of the data bus and the enable terminal to the output terminal of the enable flip flop, said sector gate producing a sector enable signal at its output terminal when the address signals on the sector address lines have predetermined values and the enable flip flop is set;

a counter register having input terminals and an output terminal, the input terminals being connected to selected ones of the data lines of the data bus, said counter storing the data signals on said selected data lines when a unique set of address signals are applied to the input terminals of the control decoder and an addresser enable signal is present on the addresser control line, said counter register incrementing the count stored by the register when a unique set of address signals is applied to the input terminals of the control decoder and an automatic addresser enable signal is present on the automatic addresser control line;

a one of two select sector switch having input terminals, output terminals, and a select terminal, said input terminals being connected to the output terminals of the counter register and to the sector address lines of the address bus, said output terminals being connected to the random access memory, said select terminal being connected to the output terminal of the sector enable gate, said sector switch applying the signals stored in the counter register to the memory when the sector enable gate produces a sector enable signal and applying to the memory the signals applied to the sector address lines by the CPU when the sector enable gate is not producing a sector enable signal;

an I/O port decoder having input terminals, output terminals and an enable terminal, said output terminals being connected respectively to the chip select terminals of the I/O ports; and a one of two select communication line switch having input and output terminals and a select terminal, the input terminals being connected to the output terminals of the counter register and to selected ones of the I/O port address lines of the address bus, said select terminal being connected to the input terminals of the I/O port decoder, said communication lines switch applying the count stored in the counter register to the I/O port decoder when the enable flip flop is set and applying the signals applied to the corresponding I/O port address lines by the CPU to the I/O port decoder when the enable flip flop is reset, said enable terminal of the I/O port decoder being connected to one of the I/O port address lines of the address bus.

* * * * *